United States Patent [19]

Scholz

[11] Patent Number: 5,120,476
[45] Date of Patent: Jun. 9, 1992

[54] PRODUCTION OF OBJECTS

[75] Inventor: Dankmar Scholz, Frankenthal, Fed. Rep. of Germany

[73] Assignee: BASF Aktiengesellschaft, Ludwigshafen, Fed. Rep. of Germany

[21] Appl. No.: 627,354

[22] Filed: Dec. 14, 1990

[30] Foreign Application Priority Data

Dec. 23, 1989 [DE] Fed. Rep. of Germany ....... 3942859

[51] Int. Cl.⁵ .................... B29C 35/08; B29C 41/00
[52] U.S. Cl. ........................... 264/22; 156/64; 156/273.5; 156/275.5; 250/492.1; 264/40.7; 264/298; 264/308; 364/476; 427/8; 427/53.1; 427/54.1
[58] Field of Search .......... 264/22, 40.1, 40.7, 264/298, 308; 156/64.242, 273.3, 273.5, 275.5, 307.1; 427/8, 53.1, 54.1, 430.1; 250/492.1; 364/468, 476, 522, 523; 365/106, 107, 119, 120, 126, 127; 430/270, 327, 328

[56] References Cited

U.S. PATENT DOCUMENTS 4,575,330 3/1986 Hull .................................. 264/22 X
4,749,347 10/1986 Valavaara ........................... 425/135
4,961,154 10/1990 Pomerantz et al. ................ 364/522

Primary Examiner—Leo B. Tentoni
Attorney, Agent, or Firm—Oblon, Spivak, McClelland, Maier & Neustadt

[57] ABSTRACT

Three-dimensional objects are produced by the polymerization of a photopolymerizable liquid medium with the aid of high-energy radiation by continuously introducing the liquid medium in lamina form from a casting means onto the surface of a carrier liquid which has a higher specific gravity than the photopolymerizable medium and is not miscible therewith. This lamina is polymerized by irradiation to form a laminar, two-dimensional polymer layer, then the surface of the carrier liquid is raised and another lamina of the photopolymerizable medium is introduced onto the surface and polymerized to form a further polymer layer which combines with the preceding one. These steps are repeated until the three-dimensional object is formed. The steps of forming the polymer lamina and raising the surface of the carrier liquid may be computer controlled.

5 Claims, 1 Drawing Sheet

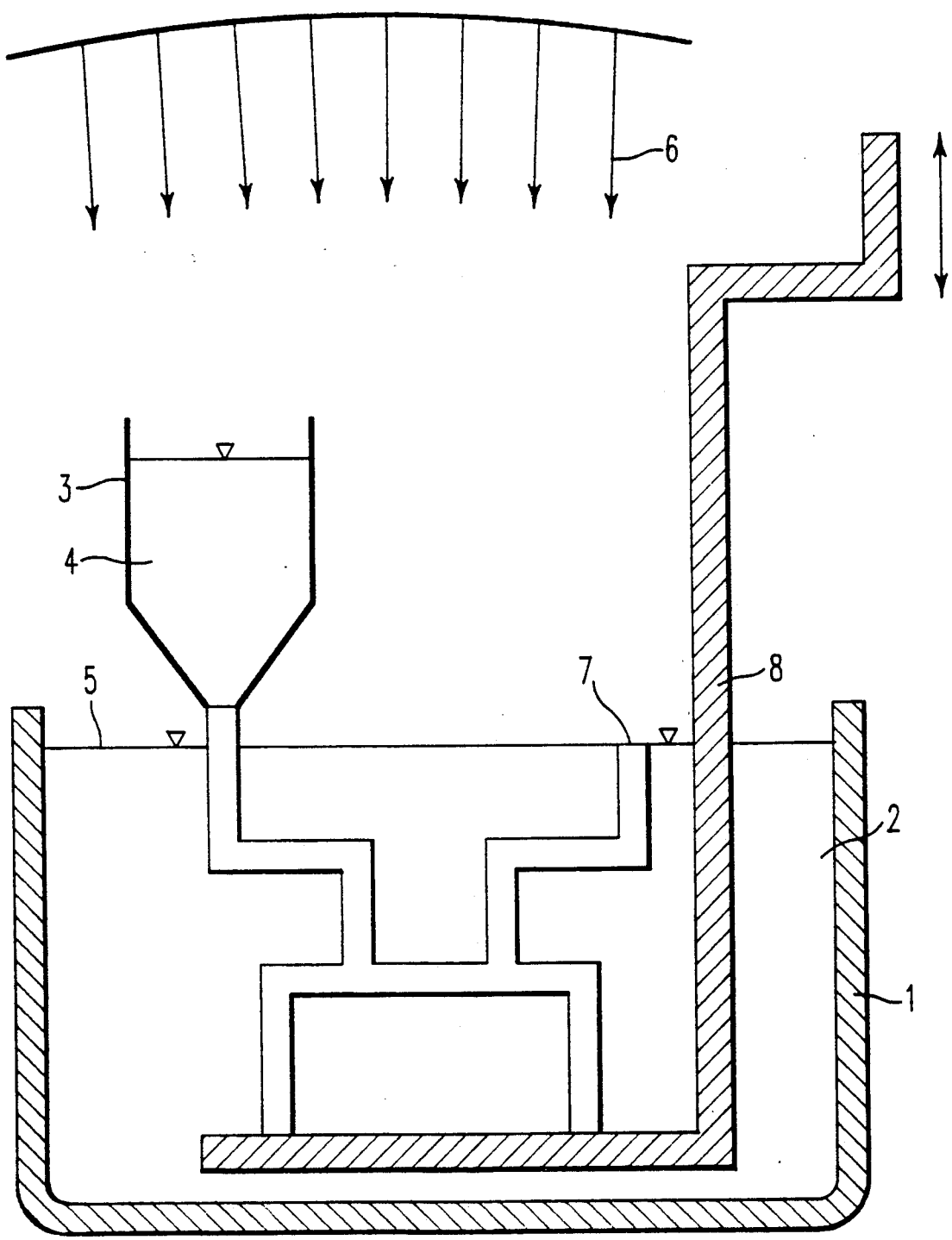

PRODUCTION OF OBJECTS

The present invention relates to a process for producing three-dimensional objects by polymerization of a photopolymerizable liquid medium with the aid of high-energy radiation by continuously producing a laminar, two-dimensional polymer layer on the surface of a liquid, raising the surface of the liquid and then again producing a two-dimensional polymer layer which adheres to the preceding layer, and repeating these steps until the three-dimensional object is formed.

BACKGROUND OF THE INVENTION

This process has become known as "stereolithography". It can be used for example for producing a prototype of a part from a computer aided design drawing directly, i.e. without mechanical work. A preferred form of this process is described in U.S. Pat. No. 4,575,330. The three-dimensional object is produced in a body of liquid medium capable of photopolymerization. A programmed movable spot of UV light shining on the surface of the liquid causes the photopolymerizable medium to become polymerized at the point of incidence. By repeatedly moving the spot of light forwards and backwards it is possible to produce a two-dimensional laminar polymer layer composed of a multiplicity of individual points. Then the platform on which this polymer layer rests is moved down and new liquid flows across the surface, and another polymer layer can be produced by specific irradiation. The polymer layers are so adhesive that they become joined together in the liquid. When finally after multiple repetition of these steps the object is formed, it is removed from the liquid, washed and completely cured in a separate operation.

Recently a stereolithography process of this type was put into industrial practice using a laser light source. However, despite the use of laser beams, the process is very time-consuming, since a multiplicity of individual points must be irradiated and the laser beam cannot be moved onto the next point until the polymerization has progressed to a sufficient extent at the preceding point, which takes a few seconds. Despite this long polymerization time, the object still needs to be fully cured in a separate operation. Moreover, the use of laser beams is very costly.

SUMMARY OF THE INVENTION

It is an object of the present invention to develop a simple and inexpensive process for stereolithography whereby three-dimensional objects can be produced in a comparatively short time, even in complicated shapes.

This object arises in particular in relation to a process for producing a three-dimensional object by polymerizing a photopolymerizable liquid medium with the aid of high-energy radiation by a) producing a laminar, two-dimensional polymer layer on the surface of a liquid, b) raising the surface of the liquid by an amount which corresponds to the thickness of the laminar polymer layer and then again producing a two-dimensional polymer layer which connects to the preceding one, and c) repeating steps a) and b) until the three-dimensional object is formed.

We found that this object is achieved by continuously introducing onto the surface of the liquid, from a casting means, a lamina of the photopolymerizable liquid medium, which has a lower specific gravity than the carrier liquid and is not miscible therewith, and then polymerizing it by irradiation.

The process of the present invention is based on a photopolymerizable liquid medium, preferably based on ethylenically unsaturated acrylic or vinyl compounds. Preference is given to high molecular weight compounds, for example long-chain acrylic esters or reaction products of acrylic acid or methacrylic acid with di- or polyepoxides, i.e. epoxyacrylates. It is also possible to use unsaturated polyesters and long-chain divinyl compounds. The liquid medium should have a high viscosity, preferably of more than 1,000 mPas. This high viscosity can also be brought about by adding thixotroping agents, such as finely divided silica, isocyanate prepolymers or hydrogenated castor oils. The medium contains a photoinitiator. It should be such that the wavelength at which it initiates the photopolymerization overlaps with the wavelength of the radiation employed. Suitable photoinitiators are for example acylphosphine oxides, such as 2,4,6-trimethylbenzoyldiphenylphosphine oxide, benzil ketals, such as benzil dimethyl ketal, benzoin ethers, such as benzoin ethyl ether, and also benzil combined with aliphatic amines. The photoinitiators are present in the liquid medium in amounts of preferably from 0.01 to 0.2% by weight. The photopolymerizable medium may contain further customary additives, for example inhibitors or light-transmitting fillers.

This liquid medium is introduced onto the surface of the liquid from a casting means. Said casting means comprises a nozzle whose cross-section or diameter determines the width of the lamina to be polymerized. To preserve scope for variation in this respect, it is possible to employ a plurality of nozzles of different cross-sections in succession or to provide a single nozzle having a variable cross-section. To produce wide laminae it is also possible to traverse the casting means along or across the surface of the liquid a number of times. In contradistinction to the process of U.S. Pat. No. 4,575,330, where a successive point-by-point irradiation and polymerization is effected, the movement of the casting means across the surface of the liquid is continuous and uninterrupted.

The distance between the nozzle and the surface of the liquid should be kept to a minimum in order that the emerging jet of liquid should remain at a constant width and not for example become fanned out. A distance of not more than 3 mm is preferred. The liquid onto whose surface the photopolymerizable medium is introduced must not be miscible or reacted with the latter. The specific gravity of the carrier liquid must be somewhat higher than that of the photopolymerizable medium in order that the latter may not sink in but floats on top. The difference in the specific gravities, however, should not be too large either, since otherwise the buoyancy of the photopolymerizable medium on the surface would be too high, which could lead to runniness. If the liquid medium is sufficiently viscous, it will not lose its shape on application to the surface, or at least not to any great extent, especially not when the polymerization proceeds rapidly. The process of polymerization generally results in shrinkage, causing the specific gravity to increase. The polymer layer formed then sinks more deeply into the carrier liquid, which is desirable. Preferably, the carrier liquid is a solution of a solid, the specific gravity of which can be set in a specific manner by the amount of dissolved solid. It is particularly advantageous to use an aqueous salt solution.

The high-energy radiation which initiates the photopolymerization can be visible, UV or IR light of any desired wavelength. Preference is given to UV light of wavelength 340–450 μm, as emitted for example by commercial quartz lamps. This light illuminates the entire liquid surface uninterruptedly, preferably from all sides. This is in contrast to the process of U.S. Pat. No. 4,575,330, where irradiation is spotwise which requires an expensive laser source. The polymerization-initiating irradiation is applied not only at the moment of the impingement of the liquid film on the surface of the carrier liquid but throughout the entire process, and it also reaches underneath the surface of the liquid. The polymer lamina formed can thus undergo virtually complete curing. In the preferred process, the polymer lamina has a thickness of from 0.02 to 5 mm, in particular from 0.1 to 1 mm; within 2–20 seconds it has become polymerized to such an extent that its consistency is solid. Additionally, the polymerizable liquid medium and/or the carrier liquid may be brought to elevated temperatures.

Once the first laminar, two-dimensional polymer layer is produced, the surface of the liquid is raised by an amount which corresponds to the thickness of the formed polymer layer, and then another two-dimensional polymer layer is produced. This raising of the surface of the liquid can be effected with various forms of apparatus, for example as described in U.S. Pat. No. 4,575,330 with a movable platform which supports the three-dimensional object being formed. This platform is lowered once the first polymer layer has been formed. As a result, the surface of the liquid rises relatively to the object, and covers the polymer layer formed, on which the next layer can then be built up and cured. The photopolymerization of the first layer will in general have progressed only to such an extent that the surface will still be somewhat tacky, so that the new, second layer will adhere thereto and the two layers will become joined together.

In principle, it is also possible to connect the growing three-dimensional object stationarily to the floor of the vessel containing the liquid and to raise the surface of the liquid by introducing a calculated amount of carrier liquid once the formation of the first polymer layer is complete. But in this case the casting means must also be raised by a corresponding amount.

Steps a)—formation of the polymer lamina—and b)—raising the surface of the liquid—are repeated as often as is necessary until the three-dimensional object has been formed. In forming the object, it is possible to produce not only vertical walls (by exact superposition of individual polymer laminae) but also (by appropriate positioning of the laminae) inclined surfaces and also (by the application of wider laminae) horizontal zones.

Also, as with the process of U.S. Pat. No. 4,575,330, steps a) and b) of the process according to the present invention may be controlled with a computer, for example by connecting the casting means to a robot arm which in turn is under computer control.

The main advantage of the process according to the present invention over that of U.S. Pat. No. 4,575,330 is that it is significantly quicker to carry out. Furthermore, the objects obtained are virtually completely cured, since the light rays penetrate far into the carrier liquid and thus also reach and cure the lower regions of the object. Finally, there is no need for an expensive laser source and the consumption of photopolymerizable liquid medium is less, since everything that emerges from the casting means is polymerized and nothing is lost in a wash process.

DESCRIPTION OF THE DRAWING

The drawing shows a diagrammatic sketch of a preferred embodiment of the invention:

A vessel (1) holds the carrier liquid (2). Emerging from the casting means (3), the photopolymerizable liquid medium (4) is introduced onto the surface (5) of the carrier liquid. High-energy radiation (6) impinging upon the lamina introduced onto the surface of the carrier liquid initiates the polymerization, causing the three-dimensional object (7) which rests on a raisable and lowerable platform (8), to be formed layer by layer. The movements of the casting means and of the platform are computer controlled.

The process according to the present invention can be used to produce objects of any desired shape, including objects having a complicated internal structure, for example models, patterns and prototypes for mass production.

We claim:

1. A process for producing a three-dimensional object by polymerizing a photopolymerizable liquid medium with high-energy radiation by
    a) producing a laminar, two-dimensional polymer layer on a surface of a carrier liquid,
    b) raising the surface of the carrier liquid by an amount which corresponds to a thickness of the laminar polymer layer and then again producing a two-dimensional polymer layer which connects to the preceding one, and
    c) repeating steps a) and b) until a three-dimensional object is formed, which comprises continuously introducing onto the surface of the carrier liquid, from a casting means, a lamina of a photopolymerizable liquid medium, which has a lower specific gravity than the carrier liquid and is not miscible therewith, and then polymerizing the photopolymerizable liquid medium by irradiation of the entire photopolymerizable liquid surface uninterruptedly.

2. A process for producing an object as claimed in claim 1, wherein the photopolymerizable liquid medium comprises an ethylenically unsaturated acrylic or vinyl compound and a photoinitiator.

3. A process for producing an object as claimed in claim 1, wherein the photopolymerizable liquid medium is thixotropic.

4. A process for producing an object as claimed in claim 1, wherein the carrier liquid onto whose surface the photopolymerizable liquid medium is introduced is an aqueous salt solution.

5. A process for producing an object as claimed in claim 1, wherein the introduction of the lamina from the casting means onto the surface of the carrier liquid is computer controlled.

* * * * *